PIEZOELECTRIC TRANSFORMER

Original Filed Aug. 8, 1966 2 Sheets-Sheet 1

INVENTOR
HUGO W. SCHAFFT
BY
Mueller, Aichele & Rauner
ATTYS.

INVENTOR
HUGO W. SCHAFFT
BY Mueller, Aichele & Rauner
ATTYS.

United States Patent Office 3,487,239
Patented Dec. 30, 1969

3,487,239
PIEZOELECTRIC TRANSFORMER

Hugo W. Schafft, Des Plaines, Ill., assignor to Motorola, Inc., Franklin Park, Ill., a corporation of Illinois Continuation of application Ser. No. 570,949, Aug. 8, 1966. This application Dec. 10, 1968, Ser. No. 795,378
Int. Cl. H02n *1/06*
U.S. Cl. 310—8.5 12 Claims

ABSTRACT OF THE DISCLOSURE

A piezoelectric transformer has motor and generator portions operating as a shear mode vibrator. The resonance determining dimension along each portion of the transformer is related to the overall polarization at that portion to cause a single frequency of resonance of the transformer.

This application is a continuation of the application of Hugo W. Schafft, Ser. No. 570,949, filed Aug. 8, 1966, now abandoned.

BACKGROUND OF THE INVENTION

Transformers have varied applications such as, for example, in a television receiver high voltage system which steps up and rectifies pulses at the horizontal deflection rate to provide a DC potential for the screen of the cathode ray tube. Since relatively low amplitude pulses are available, the transformer must provide a relatively high voltage step-up. Generally, in present day high voltage systems, an electromagnetic-type transformer is used for this purpose. However, the electromechanical-type transformer such as one composed of piezoelectric material has many significant advantages so that in the future such devices may replace the electromagnetic-type transformer.

A piezoelectric transformer consists of a motor or driver portion and a generator or driven portion. An electrical signal is applied to the former and by well-known piezoelectric effect, the electrical energy is converted into mechanical energy. The mechanical energy is coupled to the generator portion which responds thereto to reconvert the mechanical energy back to electrical energy, again, by way of the piezoelectric effect. In order to remove losses that may occur at a junction, the generator and motor portions are often integrally connected. The advantages of a piezoelectric transformer are several. For example, piezoelectric material has an inherently high Q so that even though an input signal with many harmonics is applied, the output is fairly close to a pure sine wave thus reducing high level harmonics that may radiate back into the receiver. Also, it may be made in a smaller package and is self-insulating. Further, there are no problems with respect to breakdown voltages between windings normally associated with an electromagnetic type. Other advantages are the relatively high step-up or transformation ratio and the fact that a ceramic device is non-magnetic with all its environmental implications.

It has been found both by experiment and mathematical computation that operating a transformer in its shear mode produces the highest coupling factor, that is conversion from electrical energy to mechanical energy and back to electrical energy, so that there is less insertion loss. In addition, the voltage step-up is significantly higher than that provided by thickness or longitudinal modes. Although there have been attempts in the past to use shear mode vibrations in a piezoelectric transformer, they have not been altogether successful in obtaining high efficiency.

SUMMARY OF THE INVENTION

It is an object of this invention to provide a frequency selective piezoelectric transformer which is easily and inexpensively produced.

It is a further object to provide a piezoelectric transformer operated in its shear mode so as to provide improved efficiency, voltage step-up and coupling factor.

It is a further object to provide a piezoelectric transformer in which the resonant frequency at the transformer output is detemined by its composite velocity of propagation rather than the separate velocities of propagation through the motor portion and through the generator portion.

It is another object to provide a shear mode transformer having a response with a single peak.

In brief, one form of the transformer device is composed of piezoelectric material and has a rectangular cross-section with long and short dimensions. The device has a polarized motor portion with electrodes adapted to receive and convert electrical energy into vibratory energy by shear mode operation. The vibratory energy is mechanically coupled to a polarized generator portion of the device for reconversion into electrical energy. The resonant frequency of the transformer is related to the wavelength determining dimension and the velocity of propagation, the latter being affected by the direction of polarization. Although the polarization directions in the generator portion and the motor portion may not be parallel so that the respective velocities of propagation are different, the composite velocity of propagation of energy through the device, which is the resultant of the separate velocities of propagation, is constant along each axis parallel to the short dimension. It is this composite velocity along with the length of the short dimension of the rectangular cross-section which determines the resonant frequency of the transformer. Since there is only one composite velocity of propagation, the transformer provides a single peaked response.

Figure 1:
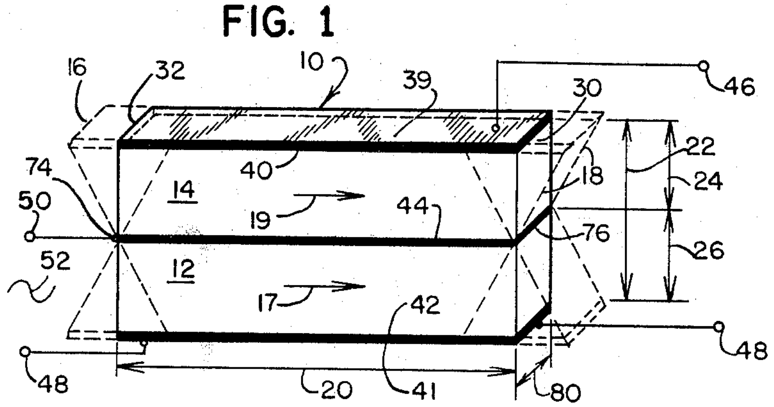
FIG. 1 is a perspective view of a piezoelectric transformer constructed in accordance with this invention.

Referring now to FIG. 1, there is shown a shear mode transforming device or body 10 having a rectangular cross-section with a longitudinal dimension 20 and a lateral dimension 22. The device is composed of a piezoelectric ceramic material such as barium titinate or lead zirconate, the latter being more efficient than the former and being presently available under the designation of PZT–4 from the Clevite Corporation of Cleveland, Ohio. The device comprises a motor or driver portion 12 and a generator or driven portion 14. These portions may be separately manufactured items and connected together by means of epoxy or other suitable cement. More desirably, however, they are integrally connected so as to limit the losses which may occur at a cemented junction.

The portions are each permanently electrically polarized as a unit or separately depending on whether or not the device is an integral unit. The direction of polarization in the motor portion and in the generator portion are indicated by arrows 17 and 19 respectively, and, as shown, both are in the same direction along an axis parallel to long dimension 20.

Figure 2:
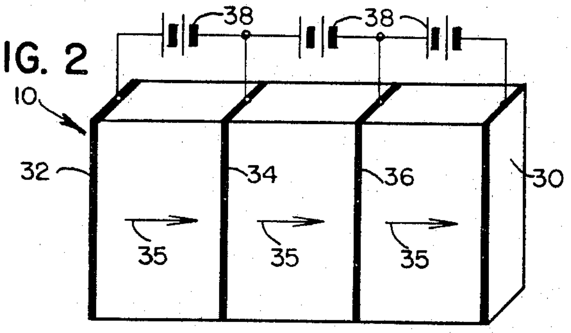
FIG. 2 illustrates a method for polarizing such a transformer.

A variety of techniques are available to polarize piezoelectric material such as, for example, securing a pair of electrodes to the sides 30 and 32 of the device 10 and applying a DC potential thereto. The connection being of such polarity as to polarize along or parallel to longitudinal dimension 20 in the direction desired. After the polarization operation is completed these electrodes 30 and 32 are etched away. Another method which would not require an excessively high DC voltage is shown in FIG. 2 in which electrodes are plated onto sides 30 and 32 and further electrodes 34 and 36 are connected around the periphery of device 10. A battery 38 or other suitable DC source is connected across each pair of electrodes as shown so as to cause polarization in each section in the direction indicated by arrows 35 with the resultant also in that direction. The batteries are removed and the pair of electrodes on the sides and the intermediate electrodes are etched away after maintaining the fields for a sufficient period of time to approach saturation of the piezoelectric effect.

Referring back to FIG. 1, operating electrodes 39 and 41 are then plated on the top face 40 of generator portion 14 and the bottom face 42 of driver portion 12 respectively. If the device 10 is an integral unit, a further electrode or conductor 44 is plated about the periphery thereof, as shown. If the motor and generator portions constitute separate pieces, then electrode 44 would be plating interposed between the two portions. A set of terminals 46, 48 and 50 are connected to their respective electrodes. Preferably, terminal 50 constitutes the input to the transforming device 10 and terminal 46 constitutes the output thereof with terminal 48 being common between input and output.

In response to an input or electrical signal 52 applied to input terminals 48 and 50, an electric field is developed from electrode 44 to electrode 41 which is perpendicular to the polarizing field indicated by directions 17 and alternately changes its polarity in accordance with the frequency of the input signal. The resultant of the polarizing field and the electric field produces a strain along a diagonal dimension of motor portion 12, to drive it into a shear mode. The output signal is developed between terminals 48 and 46 so that the electric field to be developed between electrodes 39 and 41 is perpendicular to the polarization direction 19 of generator portion 14. Thus, the shear mode vibrations developed by motor portion 12 are translated to generator portion 14, which reconverts the mechanical energy back to electrical energy. The movement is shown in exaggerated proportions by dotted lines 16 and 18. As the electrical signal alternately changes polarity at a rate according to its frequency, the device 10 shifts between positions 16 and 18 at that rate. Since ceramic material is known to have a high Q, there is a voltage step-up from the input terminals to the output terminals, thereby providing the desired transformer action. The ratio of the respective lengths 24 and 26 of the generator portion and the motor portion to the short dimension 22 also affects the voltage step-up.

The resonant frequency of device 10 is equal to the composite velocity of propagation of energy divided by the wavelength determining dimension. It is known that for shear mode operation this dimension is the length of the shortest side of the rectangular cross-section, namely dimension 22. The composite velocity of propagation through device 10 is in the lateral direction and is the resultant of the velocity of propagation through motor portion 12 and the velocity of propagation through generator portion 14. The velocity of propagation through each portion is related to the direction of polarization in the respective portions. It is to be noted that in this embodiment the polarization direction in both the generator and motor portions are parallel so that the composite velocity of propagation is the same at any point in the device and therefore constant along any lateral axis. However, in an embodiment to be described subsequently, the polarizations do not have the same orientation so that the velocities are different.

Figures 3, 6:
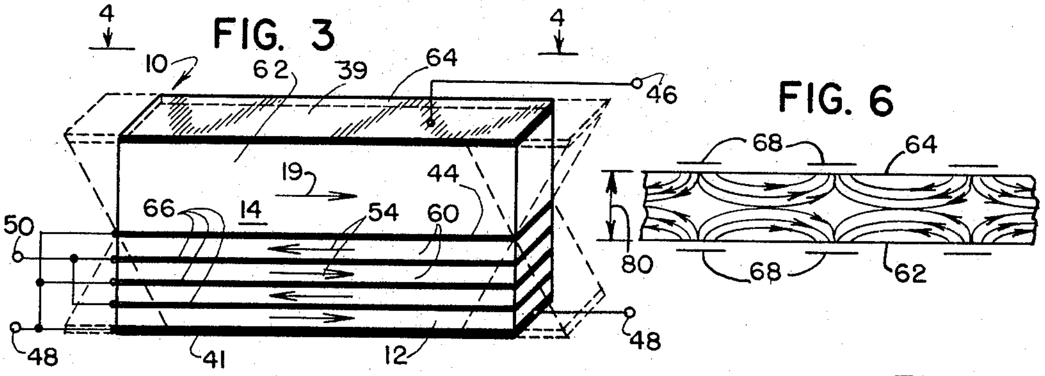
FIG. 3 illustrates another embodiment of this invention.
FIG. 6 is a sectional view taken along the line 6—6 of FIG. 5.

The transforming device of FIG. 3 provides improvement over that shown in FIG. 1. Motor portion 12 consists of a plurality of slabs or layers 60 in which adjacent ones are polarized in opposite longitudinal directions as shown by the arrows 54. The slabs are secured together and to the generator portion 14 by means of cement. Electrodes 66 are interposed between the slabs, alternate ones of which are connected together and to input terminal 50 with the remaining electrodes connected to common terminal 48.

Figure 4:
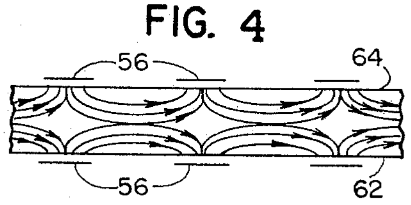
FIG. 4 is a top plan view of one of the sections of the transformer in FIG. 3.

Alternately, this arrangement may be accomplished by employing an integral transforming device 10 in order to minimize junction losses. First, a block of ceramic material is polarized throughout, in the direction indicated by arrow 19 by using a process similar to that explained with reference to FIG. 2. Then the motor portion 12 is repolarized such that adjacent sections are polarized in opposite directions as indicated by arrows 54. The latter may be accomplished by slowly passing metalized brushes with a unidirectional potential applied thereto simultaneously on the front face 62 and the rear face 64. FIG. 4 which is a plan view of one of the sections 60, shows this in greater detail. The brushes 56 have a width corresponding to the desired width of a section and are shown at various points as it travels along faces 62 and 64. The field created will be substantially longitudinal and in the direction shown. The same polarity potential is used for alternate sections on the motor portion 12 with the remaining sections polarized in the opposite direction by reversing the polarity of the potential to the brushes. After the sections become permanently polarized, the brushes are removed and an electrode 66 is connected around the device 10 at each junction where the polarization vectors reverse direction so as to provide a striping effect. An electrode 41 is plated on the bottom of motor portion 12, an output electrode 39 is plated onto generator portion 14, and a further electrode 44 is plated about the periphery of the junction between the generator and motor portions.

Whichever method is used, whether slabs or an integral unit, the electric field across each section developed in response to a signal applied to input electrodes 48 and 50 and the direction of the polarization in each section are perpendicular to one another so that the resultant causes a relatively small strain along a dimension transverse to lateral dimension 22. The composite of these small strains causes a shear mode deformation to be developed in the motor portion. The effect of this shear mode on generator portion 14 and the resulting mechanical movement as represented by the dotted lines 16 and 18 are similar to that explained with reference to FIG. 1.

The desirability of developing the shear mode by utilizing many small strains is due to the following. One of the important factors in developing a usable transformer is, of course, the provision of a high voltage step-up or transformation ratio. It is known that a low input impedance working against a high output impedance will accomplish this. The total capacitance between electrode 41 and the electrode 44 increases in proportion to the number of sections or slabs that are used. Since impedance is indirectly proportional to capacitance, the input impedance across terminals 48 and 50 is significantly less than that between terminals 48 and 50 of FIG. 1.

The direct shear mode operation, that is, the polarization field being perpendicular to the electric field, provides the largest voltage step-up. It should be noted that both the generator portion and the motor portion in FIG. 3 are being operated in a direct shear mode. This plus the high ratio of output impedance to input impedance and the fact that ceramic material provides an inherently high Q all contribute to a high voltage step-up in device 10.

Another embodiment of this invention is described with reference to FIG. 5. Again, striped electrodes are used in the motor portion 12 in order to provide a low input impedance to the signal applied thereto. The striping continues on bottom face 42 and on rear face 64 of the device 10. The method of preparing this configuration is simpler than that of FIG. 3 because the striped electrodes 68 may be used for both polarization purposes and for applying the electrical signal in actual use. Alternate ones of the electrodes are electrically connected together and to terminal 48 and the remaining electrodes are connected to terminal 50. A DC energy source is connected between the two terminals so that the polarization in each section is along a diagonal dimension and is opposite to that in its adjoining section as indicated by arrows 70.

Figure 5:
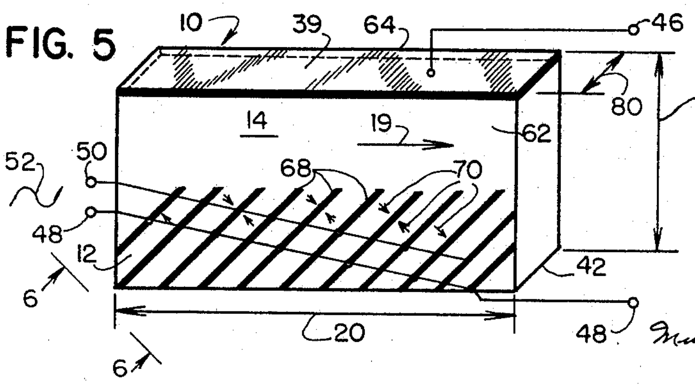
FIG. 5 is a perspective view of still another embodiment of the invention.
Figure 7:
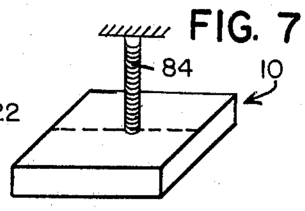
FIG. 7 illustrates a method for mounting a piezoelectric transformer.

Reference is made to FIG. 6 which is a view of the bottom face 42 along line 6—6 of the device 10 of FIG. 5 to illustrate schematically the electrostatic flux distribution. The sections between electrodes 68 are polarized in opposite directions with abrupt changes at each electrode. The ideal situation would be a polarization field which is parallel to front face 62 and rear face 64. This being impractical, an approximation of the ideal can be had as shown, in which case there is some "wasted area," in other words, portions in the vicinity of the electrodes carry a relatively small horizontal flux component. In order to keep this wasted area at a minimum, the width of dimension 80 of device 10 can be kept at a minimum without affecting the resonant frequency because this dimension is not determinative thereof. The factor which may limit the thinness of dimension 80 is the desirability that the device 10 not vibrate in a bending mode which would radiate a great deal of energy due to the large lateral area of the resulting piston. However, even where a relatively thin device is utilized the bending motion may be limited as in FIG. 7 by employing a rod or post 84 supported at one end and formed of high loss material such as rubber in order to introduce maximum damping at the bending mode and minimum damping at the shear mode. The bending motion may be further limited by insuring that the frequency of the applied electrical signal 52 is not harmonically related to the bending resonant frequency.

After maintaining the polarizing field for a sufficient period of time to approach saturation of the piezoelectric effect, the DC energy source is removed. When an AC signal 52 is applied between input terminals 48 and 50, a varying electric field is developed between the electrodes 68 and parallel to the polarization direction indicated by arrows 70. The individual section strains caused by the combination of the polarization vector and the electric field vector are along a dimension transverse to lateral dimension 22 so that the resultant of these individual section strains causes a shear mode deformation to be developed in the motor portion as was the case in FIGS. 1 and 3 but, however, by an indirect method, namely utilizing a longitudinal mode in a diagonal or transverse, direction to effect shear mode operation. As was true in the previous embodiments, the generator portion 14 is polarized in a direction indicated by arrow 19. In practice, a simple method would be to polarize the entire unit in a horizontal direction and then plate on the striped electrodes 68 followed by repolarization of the motor portion in the desired directions.

An important difference between this embodiment and the embodiments of FIGS. 1 and 3 is that fact that in the former, the polarization direction in the generator portion is not parallel to the polarization in the motor portion. Since the velocity of propagation through a ceramic element is dependent upon the direction of polarization, the velocity of propagation is different in the motor portion than it is in the generator portion. The resonant frequency is equal to the velocity of propagation divided by the wavelength determining dimension, which, as explained previously, is the length of dimension 22. Thus, the resonant frequency in the motor portion is different than the resonant frequency in the generator portion. However, even though the velocities of propagation are different, the output is derived across the generator portion and the motor portion so that the composite velocity of propagation of energy through the device as a unit which is the resultant of the separate velocities of propagation is the significant parameter. There is only one composite velocity of propagation and it is constant along an axis parallel to lateral dimension 22 so that there is only a single resonant frequency of the device, namely, the composite velocity of propagation divided by the length of dimension 22. Another way of stating it is that the resonant vibrations travel in a path normal to longitudinal dimension 20 to traverse a constant composite orientation of polarization. This aspect is important in order to provide a response having a single peak.

It will be noted that in the embodiments of FIGS. 1, 3 and 5, both the motor portion and the generator portion are driven into shear mode vibrations whether it be directly by utilizing an electric field perpendicular to the polarization field or indirectly by utilizing a field parallel to the polarization field but along a diagonal or transverse dimension. It is significant that the shear mode is used and advantageous over other ways to use piezoelectric material such as longitudinal or hoop modes because it is known that the coupling factor, that is, the conversion from electrical energy to mechanical energy and back to electrical energy, and the voltage step-up ratio, that is, the voltage output to voltage input raio are significanly higher in shear mode operation.

Transforming device 10 may be mounted most efficiently at lines 74 and 76 shown in FIG. 1 (the same holds true for the embodiments of FIGS. 3 and 5). Since sides 30 and 32 of device 10 operate as a piston alternating between positions 16 and 18, it may be appreciated that at lines 74 and 76 motion of the piston is at a minimum so that mounting thereat will provide a minimum damping to the movement.

An advantages of the above embodiments is the relatively small area of sides 30 and 32. These sides act as pistons and therefore are the chief factors for radiating vibratory energy into the surrounding air. Since dimension may be made relatively thin without affecting the resonant frequency, the piston area may be decreased to minimize radiation energy. This is especially important in a transformer used in the horizontal deflection system for scanning the beam of a cathode ray tube in a television receiver. It is known that such deflection system operates at 15,750 cycles per second which is an audible frequency to many individuals and if the device when used as a transformer in the high voltage system is allowed to radiate a high amplitude at this frequency, the viewer may be disturbed thereby. For this reason, in many prior devices the transformer was driven by the second harmonic of the horizontal frequency of 31,500 cycles per second which is out of the audible range. However, this frequency is greatly attenuated, thereby requiring a higher voltage step-up to develop the required high voltage for the tube. However, the small area utilized in this invention provides a minimum amount of radiation at 15,760 cycles per second.

Another advantage of these embodiments is that the dimension determining the resonant frequency is that labeled 22. Therefore, the long dimension 20 may be as long as desired without affecting the resonant frequency. The size requirements of the environment in which the transformer is to be placed is weighed against the power requirements of the transformer so that if large power requirements are needed, this dimension may be relatively long to thereby provide more material to carry the power and additionally more material to dissipate heat therefrom.

Figure 8:
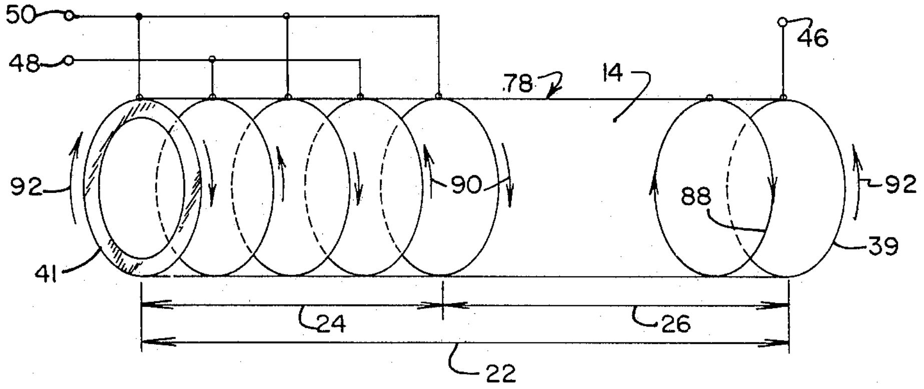
FIG. 8 is a perspective view of yet another embodiment of this invention.

In FIG. 8 there is illustrated a "rolled up" form 78 of the transformation device 10 in FIG. 3. The transformers of FIGS. 1 and 5 may also be cylindrically constructed. The motor portion is that encompassed by the dimension 24, the generator portion is encompassed by dimension 26 and the overall length 22 determines the resonant frequency of the device. An input electrode 41 is plated on the end of the motor portion and the various annular rings are stacked upon one another and cemented together by the electrically conductive cement as in the case of FIG. 3. Alternately, the motor portion and the generator portion may constitute an integral unit with annular electrodes at the junctions of the sections similar to the integral alternative of FIG. 3. Alternate ones of the electrodes between the rings of the motor portion are connected together and to the terminals 50 and 48. An output electrode 39 is disposed upon the other end of the generator portion and connected to the terminal 46.

The driven or generator section 14 is polarized continuously about the circumference of the tubular form thereof. This is indicated by the polarization arrow 88. The rings forming the motor portion are also polarized continuously in the circumferential direction with alternate ones polarized in opposite directions as indicated by the arrows 90. Upon energization of the device, an electric field produced across the rings of the motor portion will cause torsional vibration transverse to the applied field and overall torsional vibration of the device in opposite directions at the opposite ends thereof as shown by the arrows 92.

Figure 9:
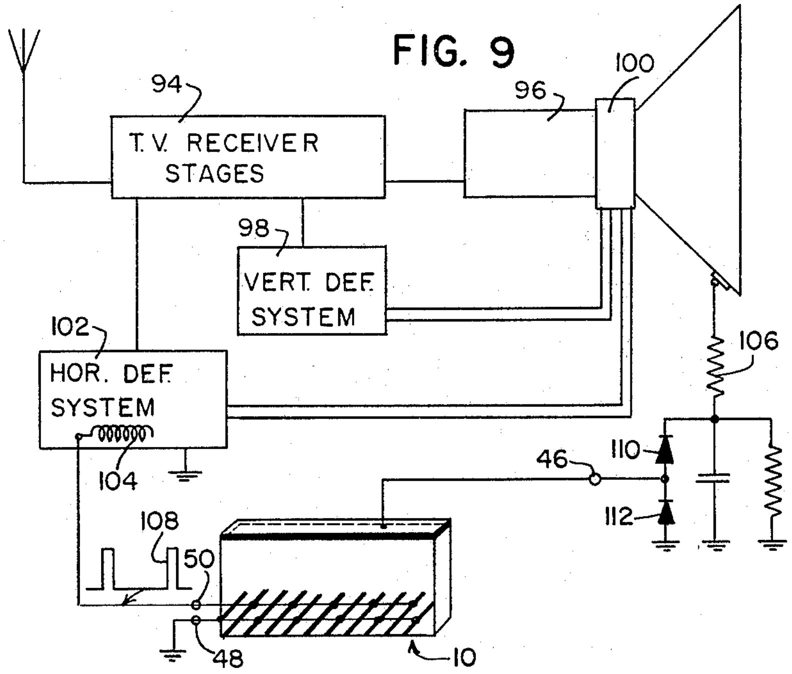
FIG. 9 is a diagram partly schematic and partly in block form showing use of a piezoelectric transformer in a television receiver.

FIG. 9 shows the use of the transforming device 10 to provide high voltage for the screen of the picture tube 96 in a television receiver. The television receiver has a unit 94 which comprises a tuner, intermediate frequency amplifiers, a detector, and a video amplifier for driving the cathode ray tube 96. In addition, unit 94 may include a synchronizing signal separator to derive vertical and horizontal synchronization signals from received composite video signals. Vertical deflection system 98 is connected to a deflection yoke 100 on the neck of the cathode ray tube 96. Horizontal deflection system 102 is also synchronized by means of the received synchronizing pulses. The top of a transformer winding 104 in horizontal deflection system 102 is connected to the input terminal 50 of the transforming device 10. The common terminal 48 is connected to ground and the output terminal 46 is connected through diode 110 and an AC isolation resistor 106 to the screen of the cathode ray picture tube 96. Waveform 108 will be applied between terminals 50 and 48 of the device 10 and a high voltage sine wave is developed at terminal 46 which is rectified and doubled by diodes 110 and 112, to provide the necessary high voltage energizing potential for tube 96.

It is characteristic of this type of device that the resonant frequency decreases as the load on the transforming device 10 increases. This may be utilized to advantage by selecting the length of dimension 22 to cause the device to resonate at 15,750 cycles per second at normal loads. If the load decreases, such as during a minimum brightness condition, the resonant frequency shifts so that the voltage applied to the load remains constant. It may be appreciated that this effects a built-in adjustment so that the voltage applied to the screen of the cathode ray tube 96 is relatively independent of changes in the load.

Since a properly designed piezoelectric device as a high Q, the output will be very close to a pure sine wave even though pulses with an infinite number of frequency components is applied to the input. This means that the high level signal derived is comparatively free of harmonics thereby limiting radiation of undesirable signals back into the receiver which, of course, facilitates receiver design.

What has been described, therefore, is an improved piezoelectric transformer operated in its shear mode so as to provide maximum efficiency, voltage step-up and coupling factor. Further, the construction of the embodiments are such that there is only one velocity of propagation governing the resonant frequency. This is mainly due to the fact that the output signal is taken across the motor portion and the generator portion.

Although this invention has been described by means of specific embodiments the invention is not limited thereto for obvious modifications will occur to those skilled in the art without departing from the spirit and scope of this invention.

I claim:

1. A transformer device including in combination,
   a body formed of polarized piezoelectric material responsive to an electric field to be driven into shear mode resonant vibration and to produce an electrical signal in response thereto,
   said body having a motor portion with input electrode means to apply an electric field thereto with the polarization thereof oriented with respect to the field to produce shear mode vibration of said body,
   said body having a generator portion with output electrode means and a polarization thereof oriented to respond to the shear mode vibration for developing the electrical signal at said output electrode means,
   said body having a shear mode resonance determining dimension with a value at each portion of said body with respect to the orientation of polarization encompassed at such portion to establish a single frequency shear mode resonant vibration throughout said body.

2. The transformer device of claim 1 wherein said body is rectangular and has longitudinal and lateral dimensions, said lateral dimension being the resonance determining dimension thereof, and said motor and generator portions being at opposite ends of said resonance determining dimension.

3. The transformer device of claim 1 wherein, said body is in the form of a hollow cylinder with said resonance determining dimension being the length of said cylinder, said cylinder being circularly polarized in a direction normal to said given dimension, said motor portion including a plurality of sections with the direction of polarization in each of said sections being opposite to the polarization in adjacent sections, said input electrode means including a plurality of annular electrodes positioned on each side of said sections with alternate ones of said annular electrodes being connected together, said output electrode means including a pair of annular electrodes positioned on each side of said generator portion.

4. The transformer device of claim 2, said motor portion and said generator portion being permanently electrically polarized in directions not parallel to one another, with respective propagation velocities of vibration therein being related to the respective polarization directions and therefore different in each of said portions.

5. The transformer device of claim 2 wherein, said body has top and bottom surfaces parallel to said longitudinal dimension, said body further being polarized in a direction parallel to said longitudinal dimension, a first electrode positioned on said top surface and a second electrode positioned on said bottom surface, a third electrode positioned between said first and second electrodes and being in a plane parallel to said top and bottom surfaces and extending around the surface of said body, said second and third electrodes forming said input electrode means and defining said motor portion and said first and second electrodes forming said output electrode means defining said generator portion.

6. The transformer device according to claim 1 further including a varying load impedance connected to said output electrode means with said electrical signal being developed thereacross, said frequency of shear mode resonant vibrations in direct relation with the value of said load impedance and falling within a given frequency range, the driving frequency of the electric field applied to said input electrode means having a constant value, the length of said resonance determining dimension being selected to cause the low end of said given frequency range to coincide with said driving frequency so that the voltage amplitude of said electrical signal is maintained relatively independent of variations in said load impedance.

7. The transformer device according to claim 2, said motor portion comprising a plurality of sections parallel to said longitudinal dimension, each of said sections being polarized in a direction opposite to the polarization of an adjacent section, said input electrode means comprising an electrode positioned on the surface of said body between each of said sections for applying an electric field therein perpendicular to its respective polarization direction and in a direction opposite to the electric field of an adjacent section so as to directly drive said motor portion into shear mode vibrations.

8. The transformer device according to claim 7 wherein, said body has top and bottom surfaces parallel to said longitudinal dimension, a first electrode positioned on said top surface and a second electrode positioned on said bottom surface, a plurality of third electrodes positioned between said first and second electrons along the boundary of each of said sections, said third electrodes further being in planes parallel to said top and bottom surfaces and extending around said body on the surface thereof, alternate ones of said second and plurality of third electrodes being connected together to form said input electrode means and said first and second electrodes forming said output electrode means.

9. The transformer device according to claim 2, said motor portion having a diagonal dimension and comprising a plurality of integrally connected sections polarized in a direction parallel to said diagonal dimension with that portion of said body not forming a part of said motor portion being polarized in a direction parallel to said longitudinal dimension, each of said sections being polarized in a direction opposite to the polarization of an adjacent section, said input electrode means comprising an electrode positioned on the surface of said body between each of said sections for applying an electric field in each section parallel to said diagonal dimension and opposite to the electric field of an adjacent section to directly drive said motor portion into longitudinal mode vibrations and to indirectly drive said body into shear mode vibrations.

10. The transformer device according to claim 9, the velocity of propagation of mechanical energy through said motor portion and through said generator portion having a fixed relationship with the respective directions of polarization, said generator portion being polarized in a direction not parallel to the direction of polarization in said sections of said motor portion so that the respective velocities of propagation are different.

11. The piezoelectric device according to claim 9, alternate ones of said electrodes being connected together and to an input terminal which is adapted to receive an electric signal with the remaining ones of said electrodes being connected to a terminal common to input and output.

12. The transformer device according to claim 9, alternate ones of said input electrode means being connected together to provide one input terminal and the remaining ones being connected to provide a second input terminal, the input impedance between said input terminals being indirectly proportional to the number of integrally connected sections, said generator portion having an output impedance between said output electrode means and said second input terminal, the ratio of said output impedance to said input impedance determining the voltage step-up of said body, the number of said sections being selected to provide a predetermined voltage step-up.

References Cited

UNITED STATES PATENTS

| | | | |
|---|---|---|---|
| 2,540,194 | 2/1951 | Ellett | 310—8.5 |
| 2,835,761 | 5/1958 | Crownover | 310—8.5 |
| 3,104,334 | 9/1963 | Bradley | 310—9.6 |
| 3,115,588 | 12/1963 | Hueter | 310—8.6 |
| 3,174,122 | 3/1965 | Fowler | 310—8.6 |
| 3,177,382 | 4/1965 | Green | 310—9.6 |
| 3,271,622 | 9/1966 | Malagodi | 310—8.1 |
| 3,363,139 | 1/1968 | Schiavone | 310—8.1 |
| 3,397,328 | 8/1968 | Schafft | 310—8.6 |

J D MILLER, Primary Examiner

U.S. Cl. X.R.

310—80, 82, 83, 96